(12) United States Patent
Uenaka (10) Patent No.: US 8,866,965 B2
(45) Date of Patent: Oct. 21, 2014

(54) IMAGING DEVICE FOR ADJUSTING A DISTANCE BETWEEN AN IMAGE SENSOR AND A LENS

(75) Inventor: Yasuhiro Uenaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 13/820,689

(22) PCT Filed: Jun. 28, 2012

(86) PCT No.: PCT/JP2012/066548
§ 371 (c)(1),
(2), (4) Date: Mar. 4, 2013

(87) PCT Pub. No.: WO2013/024634
PCT Pub. Date: Feb. 21, 2013

(65) Prior Publication Data
US 2013/0155317 A1    Jun. 20, 2013

(30) Foreign Application Priority Data

Aug. 12, 2011  (JP) .................. 2011-177052

(51) Int. Cl.
*H04N 5/225* (2006.01)
*G03B 17/04* (2006.01)
*G03B 17/02* (2006.01)

(52) U.S. Cl.
CPC ........... *H04N 5/2254* (2013.01); *H04N 5/2253* (2013.01); *G03B 17/04* (2013.01); *G03B 17/02* (2013.01); *H04N 5/2257* (2013.01)
USPC ......................................... 348/374; 250/239

(58) Field of Classification Search
CPC .. H04N 5/2253; H04N 5/2254; H04N 5/2257
USPC ................. 348/207.99, 222.1, 294, 335, 340, 348/345–357, 373–376; 396/55, 133, 144, 396/439, 529, 535; 359/694, 811, 819, 823, 359/824; 257/432–434, 680; 250/208.1, 250/239
See application file for complete search history.

(56) References Cited

U.S. PATENT DOCUMENTS

| | | | | |
|---|---|---|---|---|
| 5,005,948 A | * | 4/1991 | Takahashi et al. | ............ 359/819 |
| 5,032,919 A | * | 7/1991 | Randmae | ...................... 348/345 |
| 5,400,073 A | * | 3/1995 | Morioka et al. | .............. 348/335 |
| 5,555,051 A | * | 9/1996 | Maruyama et al. | ........... 396/144 |
| 5,739,853 A | * | 4/1998 | Takahashi | ..................... 348/335 |

(Continued)

FOREIGN PATENT DOCUMENTS

| | | |
|---|---|---|
| JP | 2002-281372 A | 9/2002 |
| JP | 2003-189158 A | 7/2003 |

(Continued)

*Primary Examiner* — Dennis Hogue
(74) *Attorney, Agent, or Firm* — Oblon, Spivak, McClelland, Maier & Neustadt, L.L.P.

(57) ABSTRACT

There is provided an imaging device including a lens mount on which a lens is mounted, an image sensor that has an imaging face on which a subject image is formed by the lens, an image sensor holder on which the image sensor is mounted, biasing members that bias the image sensor holder in a direction of the lens mount, and an adjustment mechanism that is provided between the image sensor holder and the lens mount to adjust a distance between the imaging face and the lens mount.

4 Claims, 10 Drawing Sheets

(56) References Cited

U.S. PATENT DOCUMENTS

| | | | |
|---|---|---|---|
| 5,847,888 A * | 12/1998 | Takahashi | 359/823 |
| 6,683,654 B1 * | 1/2004 | Haijima | 348/374 |
| 6,788,891 B1 * | 9/2004 | Mitsugi | 396/144 |
| 2001/0010557 A1 * | 8/2001 | Iiizumi et al. | 348/345 |
| 2004/0027458 A1 * | 2/2004 | Takada | 348/207.99 |
| 2005/0270670 A1 * | 12/2005 | Kiga et al. | 359/819 |
| 2006/0055819 A1 * | 3/2006 | Pokrovsky et al. | 348/373 |
| 2007/0077052 A1 * | 4/2007 | Chang | 396/144 |
| 2007/0217029 A1 * | 9/2007 | Kato | 359/694 |
| 2008/0174690 A1 * | 7/2008 | Chang | 348/345 |
| 2009/0174785 A1 * | 7/2009 | Uchida | 348/222.1 |
| 2009/0284640 A1 * | 11/2009 | Sakai | 348/345 |
| 2009/0303379 A1 * | 12/2009 | Wada et al. | 348/373 |
| 2011/0058804 A1 * | 3/2011 | Ito et al. | 396/439 |
| 2012/0169920 A1 * | 7/2012 | Mukai | 348/373 |

FOREIGN PATENT DOCUMENTS

| | | |
|---|---|---|
| JP | 2004-212751 A | 7/2004 |
| JP | 2007-11409 A | 1/2007 |
| JP | 2011-39462 A | 2/2011 |

\* cited by examiner

IMAGING DEVICE FOR ADJUSTING A DISTANCE BETWEEN AN IMAGE SENSOR AND A LENS

TECHNICAL FIELD

The present disclosure relates to an imaging device.

BACKGROUND ART

In the related art, an imaging device that performs flange back adjustment is known as disclosed in Patent Literature 1 below.

CITATION LIST

Patent Literature

Patent Literature 1: JP 2002-281372A

SUMMARY OF INVENTION

Technical Problem

However, as disclosed in Patent Literature 1, the unit on which the image sensor is mounted is biased in the direction separate from the lens mounting part using the compression coil spring in the configuration of the flange back adjustment mechanism of the related art. For this reason, the adjustment ring that adjusts movements of the CCD mounting body biased to the compression coil spring is disposed around the CCD substrate. In such a configuration, since the flange back adjustment mechanism is disposed around the circuit boards, there is a restriction in the disposition on the CCD substrate, and accordingly, a restriction in the space of the circuit boards. In the case of the configuration disclosed in Patent Literature 1, since the circular protruding parts that come into contact with the adjustment ring are disposed around the CCD substrate, it is necessary for the size of the CCD substrate to be smaller than that of the adjustment ring, resulting in a restriction in the size of the CCD substrate.

For this reason, in the technology of the related art, only a part of the driving system circuit of the image sensor can be disposed on the circuit boards, and it is necessary to dispose the remaining circuits on another circuit board connected using wires. For this reason, the device has a structure easily affected by noise or unnecessary radiation.

In addition, in the configuration of the related art, it is necessary to set a clearance in the direction orthogonal to the optical axis in order to allow the CCD mounting body to move, and the CCD mounting body can thereby move in the direction orthogonal to the optical axis in the range of the clearance. For this reason, when force acts on the CCD mounting body in the direction orthogonal to the optical axis, there is a problem that the CCD mounting body is deviated in the direction orthogonal to the optical axis within the range of the clearance.

Thus, for an imaging device that can perform flange back adjustment, a mechanism that enables high accuracy to be attained in a position of an image sensor in a direction orthogonal to the optical axis without causing a restriction in the size of a circuit board has been demanded.

Solution to Problem

According to an embodiment of the present disclosure, there is provided an imaging device including a lens mount on which a lens is mounted, an image sensor that has an imaging face on which a subject image is formed by the lens, an image sensor holder on which the image sensor is mounted, biasing members that bias the image sensor holder in a direction of the lens mount, and an adjustment mechanism that is provided between the image sensor holder and the lens mount to adjust a distance between the imaging face and the lens mount.

Advantageous Effects of Invention

According to the present disclosure, in an imaging device that can perform flange back adjustment, it is possible to attain high accuracy in a position of an image sensor in a direction orthogonal to the optical axis without causing a restriction in the size of a circuit board.

DESCRIPTION OF EMBODIMENT

Hereinafter, a preferred embodiment of the present invention will be described in detail with reference to the appended drawings. Note that, in this specification and the drawings, elements that have substantially the same function and structure are denoted with the same reference signs, and repeated explanation is omitted.

Note that description will be provided in the following order.

1. Overview of Imaging Device
2. Regarding Configuration of Imaging Device
3. Description of Flange Back Adjustment Mechanism
4. Holding Mechanism in Direction Orthogonal to Optical Axis

[1. Overview of Imaging Device]

First, an outlined configuration of an imaging device 100 according to an embodiment of the present disclosure will be described with reference to FIG. 1. The imaging device 100 is a lens interchangeable type device, and can perform imaging according to focal distances and angles of view of the various lenses mounted therein.

As an example, the imaging device 100 is a surveillance camera disposed in an ATM of a bank, a street lamp, or the like. The imaging device 100 according to the present embodiment is configured to have various interchangeable lenses such as a zoom lens, or a fixed-focus lens that can be interchanged. For this reason, the imaging device 100 includes a lens mount (CS mount, or the like) on which interchangeable lenses are mounted.

Figure 1:
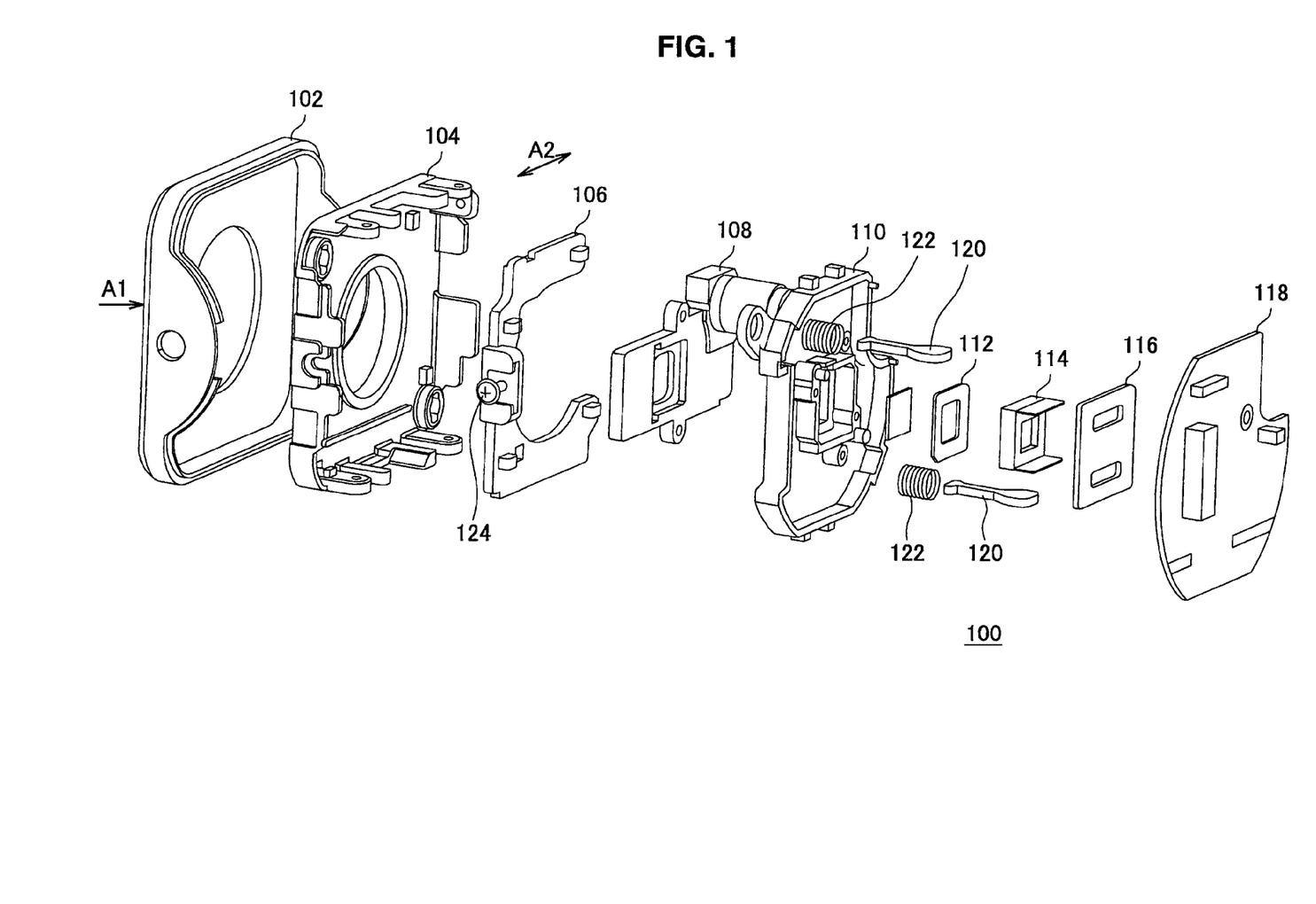
FIG. 1 is a schematic view for describing an outlined configuration of an imaging device according to an embodiment of the present disclosure.

FIG. 1 is an exploded perspective view showing a configuration of the imaging device 100. As shown in FIG. 1, the imaging device 100 is configured to have a front panel 102, a front chassis 104, a slider 106, an IR switching unit 108, a CCD (image sensor) holder 110, a seal rubber 112, a CCD (image sensor) 114, a CCD plate 116, a circuit board 118, holding plates 120, and compression coil springs (biasing members) 122. In addition, the imaging device 100 includes a housing that accommodates each of the constituent elements shown in FIG. 1, and a circuit board on which a power supply circuit and the like are mounted (not shown in FIG. 1).

In the front panel 102, a lens mount 130 (not shown in FIG. 1, refer to FIG. 3) is installed. An interchangeable lens is installed from the direction of the arrow A1 in FIG. 1, and with installation of a mount of the interchangeable lens in the lens mount 130, the interchangeable lens is integrated with the imaging device 100.

When the interchangeable lens is a zoom lens, the focal position thereof may change between a telephoto end and a wide-angle end due to the characteristics of the lens. For this reason, after the imaging device 100 is installed in a desired location, a focal position is adapted to fit into an imaging face of the image sensor over the entire zoom area from the telephoto end to the wide-angle end by fixing the focal length of zoom and performing flange back adjustment.

[2. Regarding Configuration of Imaging Device]

Next, a configuration of the imaging device 100 will be described. In FIG. 1, the front panel 102 is fixed to the front chassis 104. The slider 106 is configured to be slidable on the front chassis 104 in the direction of the arrow A2 of FIG. 1. The IR switching unit 108 is fixed to the CCD holder 110 on the side of the front panel 102. In addition, the seal rubber 112, the CCD 114, the CCD plate 116, and the circuit board 118 are fixed to the CCD holder 110 on the side opposite to the front panel 102. Accordingly, the IR switching unit 108, the seal rubber 112, the CCD 114, the CCD plate 116, and the circuit board 118 are integrated to the CCD holder 110.

Figure 2:
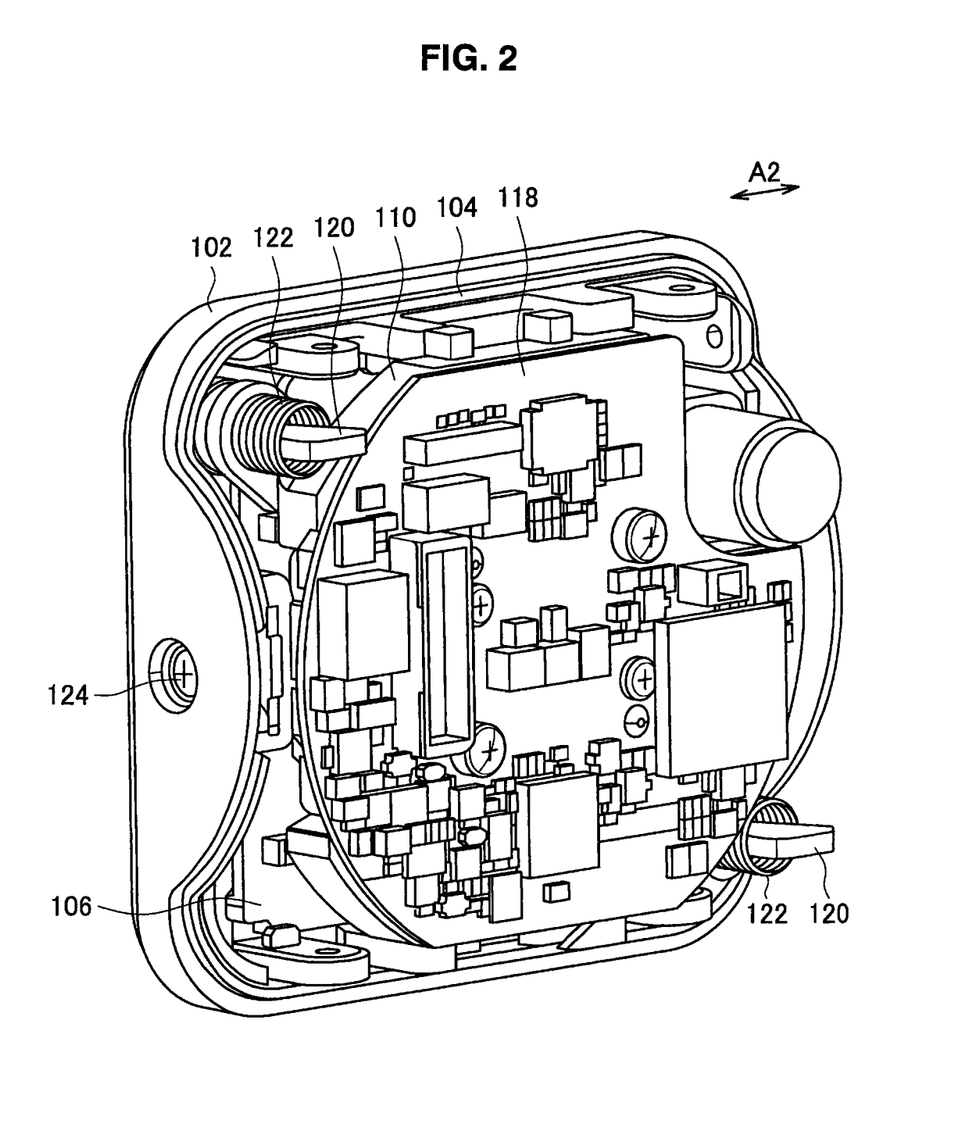
FIG. 2 is a perspective view of a state in which constituent elements shown in FIG. 1 are integrated as viewed from a circuit board side.

The constituent elements shown in FIG. 1 are integrated together by causing the compression coil springs 122 to pass through the holding plates 120 so as to fix the holding plates 120 to the front chassis 104. FIG. 2 is a perspective view of a state in which the constituent elements shown in FIG. 1 are integrated as viewed from the circuit board 118 side. In this integrated state, the slider 106 can slide in the direction of the arrow A2 that is orthogonal to the optical axis. In addition, the CCD holder 110 moves in the optical axis direction according to a sliding operation of the slider 106. Accordingly, the CCD 114 moves in the optical axis direction, and flange back adjustment is performed. Details of the flange back adjustment will be described later.

Figure 3:
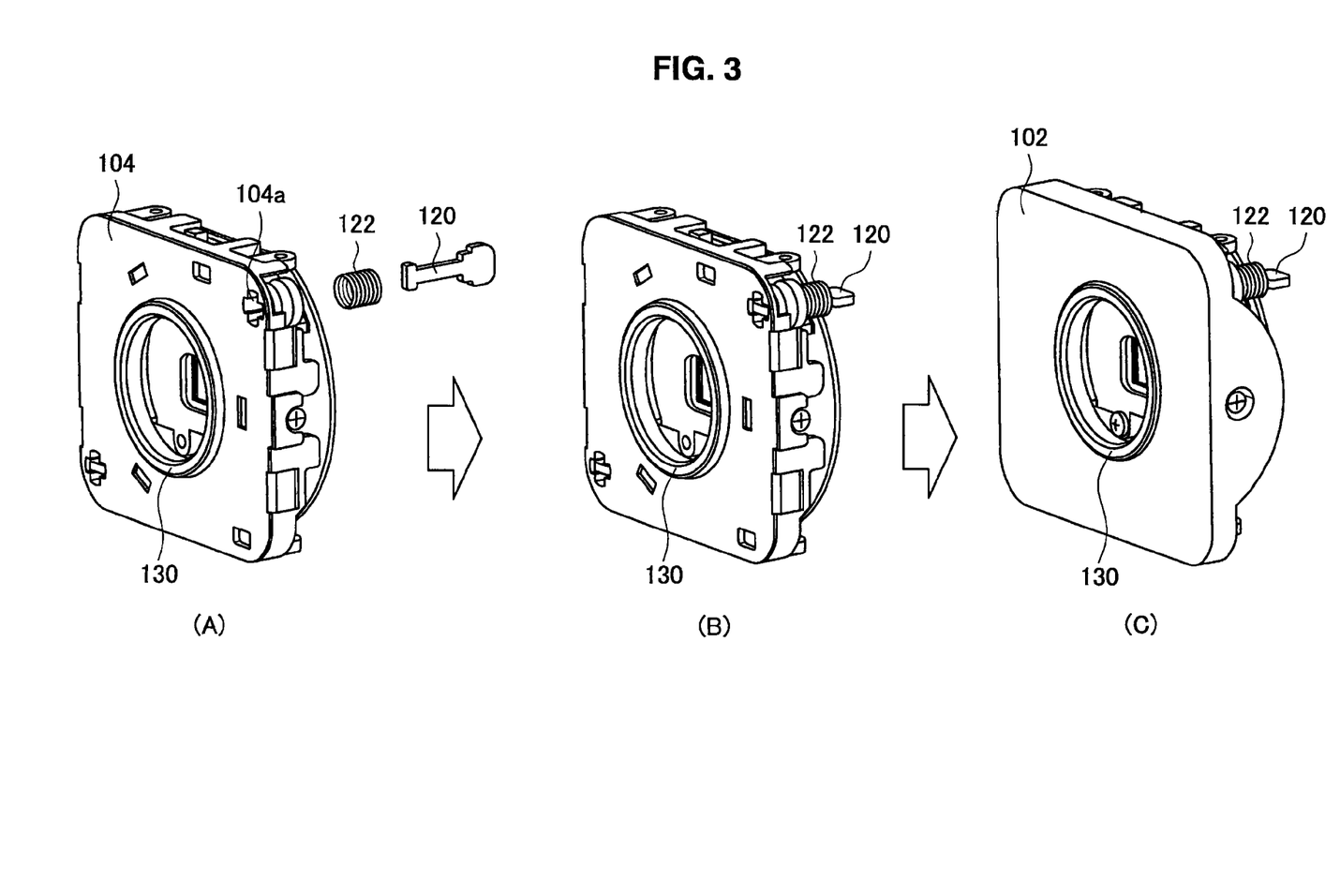
FIG. 3 is a schematic view for describing the appearance of the constituent elements shown in FIG. 1 integrated by holding plates and compression coil springs.

FIG. 3 is a schematic view for describing the appearance of the constituent elements shown in FIG. 1 integrated by the holding plates 120 and the compression coil springs 122. The constituent elements shown in FIG. 1 are accommodated on the side of the front chassis 104 as shown in FIG. 3(A). In this state, the compression coil springs 122 are inserted into the holding plates 120, so that the holding plates 120 are inserted into holes 110a and 104a of the CCD holder 110 and the front chassis 104 as shown in FIG. 3(B). Herein, the holes 110a of the CCD holder 110 are a circular shape having a width larger than that of the front end portions of the holding plates 120, and the holes 104a of the front chassis 104 are a rectangular shape corresponding to the cross-sections of the holding plates 120. Thus, after the holding plates 120 is inserted into the holes 104a of the front chassis 104 and then rotated by 90 degrees, the front ends of the holding plates 120 are engaged with the front chassis 104. Accordingly, the compression coil springs 122 are compressed while abutting the CCD holder 110, and the CCD holder 110 and the slider 106 are biased on the side of the front chassis 104 by biasing force of the compression coil springs 122. Then, the front panel 102 is installed in the front chassis 104 as shown in FIG. 3(C).

Accordingly, the CCD holder 110 abuts the slider 106 by the biasing force of the compression coil springs 122, and accordingly the slider 106 is in the state of abutting the front chassis 104. The compression coil springs 122 are provided in two places on the diagonal of the CCD holder 110. The number of the compression coil springs 122 is not limited to two, and the springs may be provided in, for example, four places around the CCD holder 110.

[3. Description of Flange Back Adjustment Mechanism]

Figure 4:
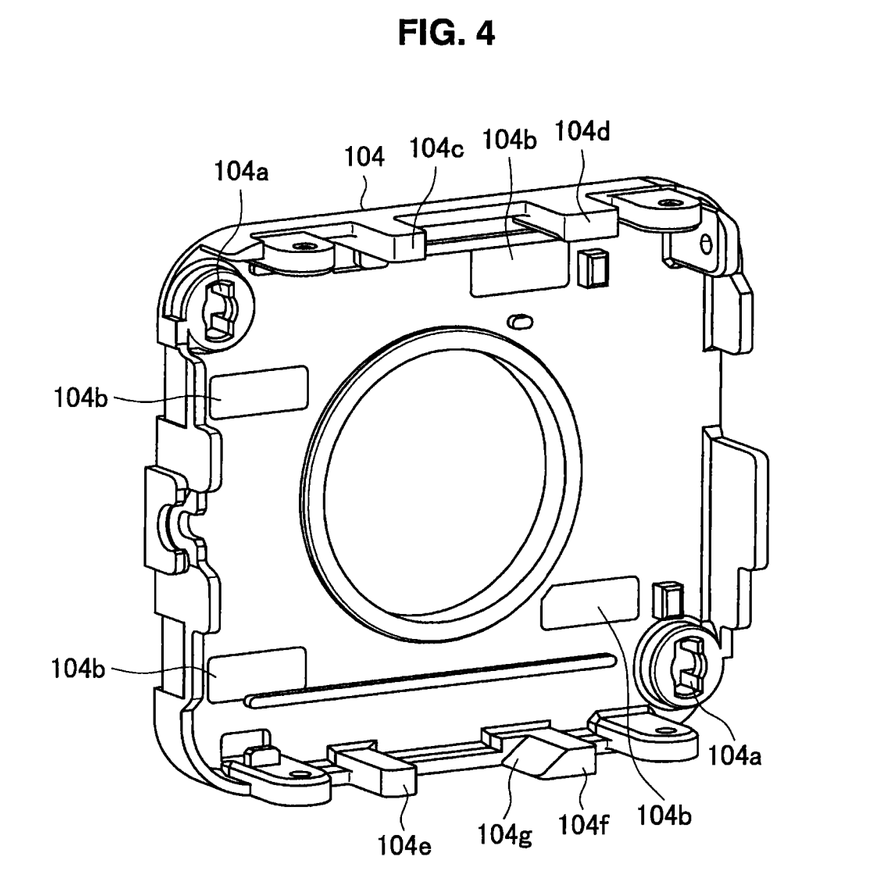
FIG. 4 is a perspective view showing the face of a front chassis that comes into contact with a slider.

Next, details of the flange back adjustment mechanism will be described. FIG. 4 is a perspective view showing the face of the front chassis 104 that comes into contact with the slider 106. As shown in FIG. 4, slide reference faces 104b that abut the slider 106 are provided on the front chassis 104. The slide reference faces 104b are set as faces that are one step higher than the periphery thereof.

Figure 5:
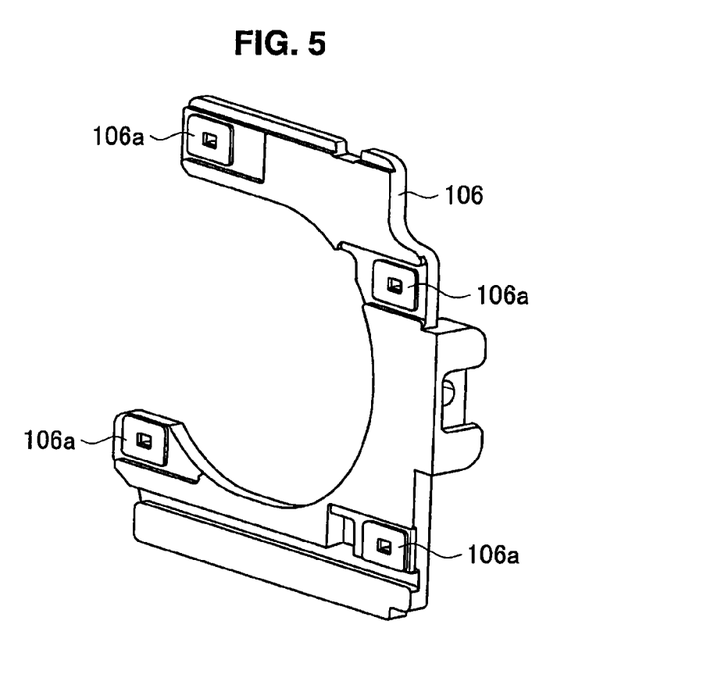
FIG. 5 is a perspective view showing the face of the slider that comes into contact with the front chassis.

FIG. 5 is a perspective view showing the face of the slider 106 that comes into contact with the front chassis 104. As shown in FIG. 5, slide reference faces 106a are provided in the slider 106 at the positions corresponding to the slide reference faces 104b of the front chassis 104.

With the configuration as described above, when the slider 106 abuts the front chassis 104 by the biasing force of the compression coil springs 122, the slide reference faces 104b of the front chassis 104 abut the slide reference faces 106a of the slider 106. Then, in this state, the slider 106 can move with respect to the front panel 104. Accordingly, the parallelism of a mount face of the lens mount 130 of the front chassis 104 with the slide reference faces 104b can be regulated with high accuracy, and the parallelism of the slider 106 with the mount face can be regulated with high accuracy.

Figure 6:
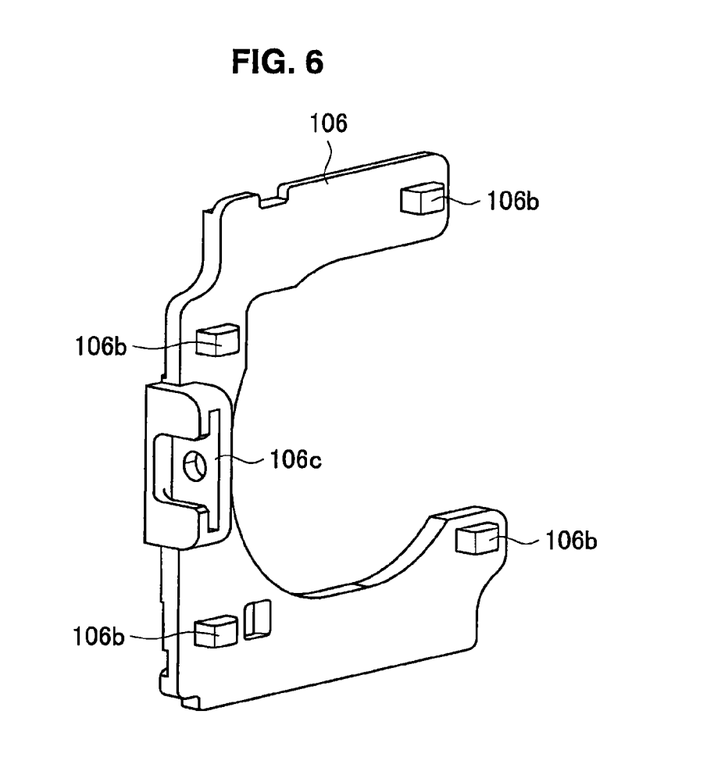
FIG. 6 is a perspective view showing the face of the slider on the side of a CCD holder.

FIG. 6 is a perspective view showing the face of the slider 106 on the side of the CCD holder 110. As shown in FIG. 6, on the face of the slider 106 on the side of the CCD holder 110, four protruding portions 106b are provided.

Figure 7:
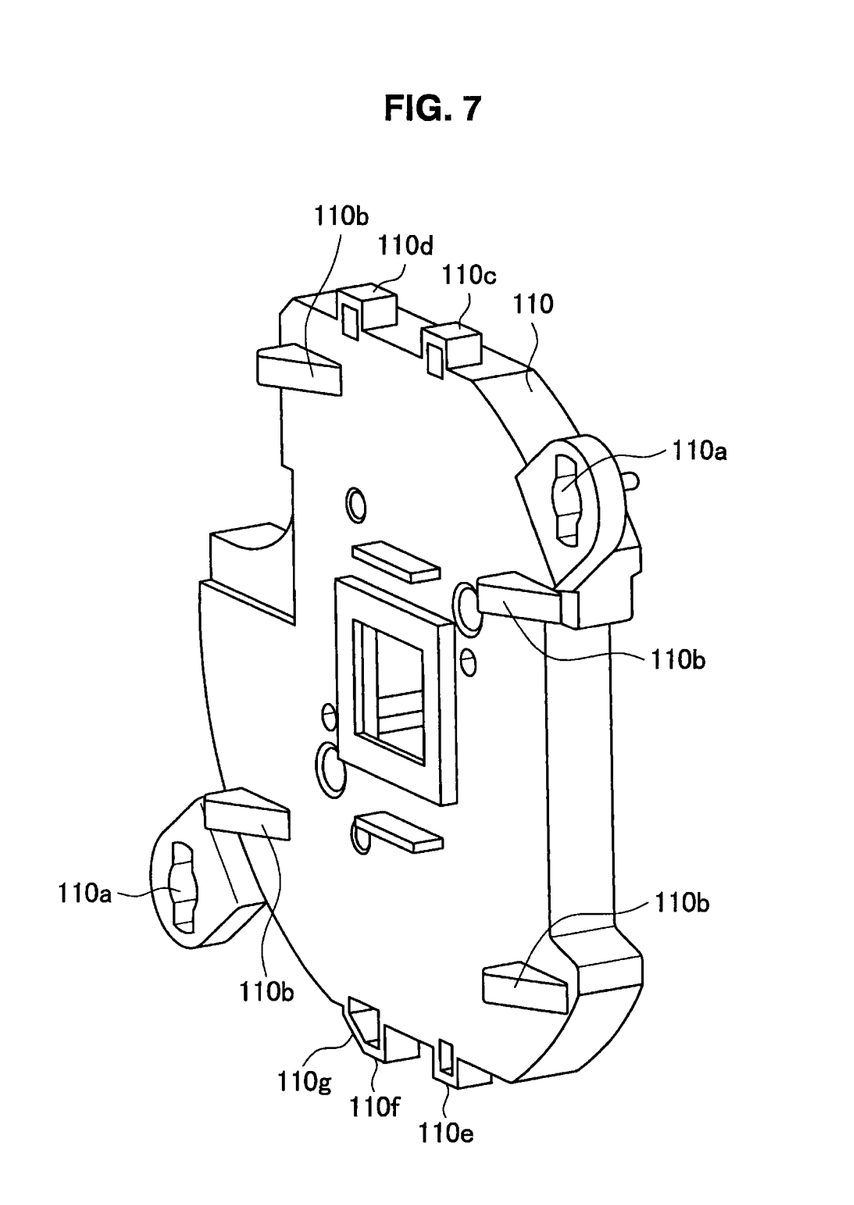
FIG. 7 is a perspective view showing the face of the CCD holder on the side of the slider.

FIG. 7 is a perspective view showing the face of the CCD holder 110 on the side of the slider 106. As shown in FIG. 7, four inclined faces 110b are provided on the face of the CCD holder 110 on the side of the slider 106 at the positions corresponding to the four protruding portions 106b of the slider 106. With this configuration, when the CCD holder 110 abuts the slider 106 by the biasing force of the compression coil springs 122, the four inclined faces 110b of the CCD holder 110 respectively abut the four protruding portions 106b of the slider 106. As described above, the parallelism of the slider 106 with the mount face is regulated with high accuracy, and the parallelism of the CCD holder 110 with the mount face can also be maintained with high accuracy with the four inclined faces 110b of the CCD holder 110 respectively abutting the four protruding portions 106b of the slider 106. In addition, with the four inclined faces 110b of the CCD holder 110 respectively abutting the four protruding portions 106b of the slider 106, the CCD holder 110 can be stably held, and even when external force is exerted on the CCD holder 110, or the like, deformation of the CCD holder 110 can be suppressed to the minimum. For example, when a relatively large connector is disposed on the circuit board 118, it is assumed that external force is exerted on the CCD holder 110 when the connector is mounted thereon, but with the four inclined faces 110b supported by the four protruding portions 106b, deformation of the CCD holder 110 can be suppressed to the minimum. Note that the numbers of the inclined faces 110b and the protruding portions 106b are not limited to four, and three of each element may be provided.

Figure 8:
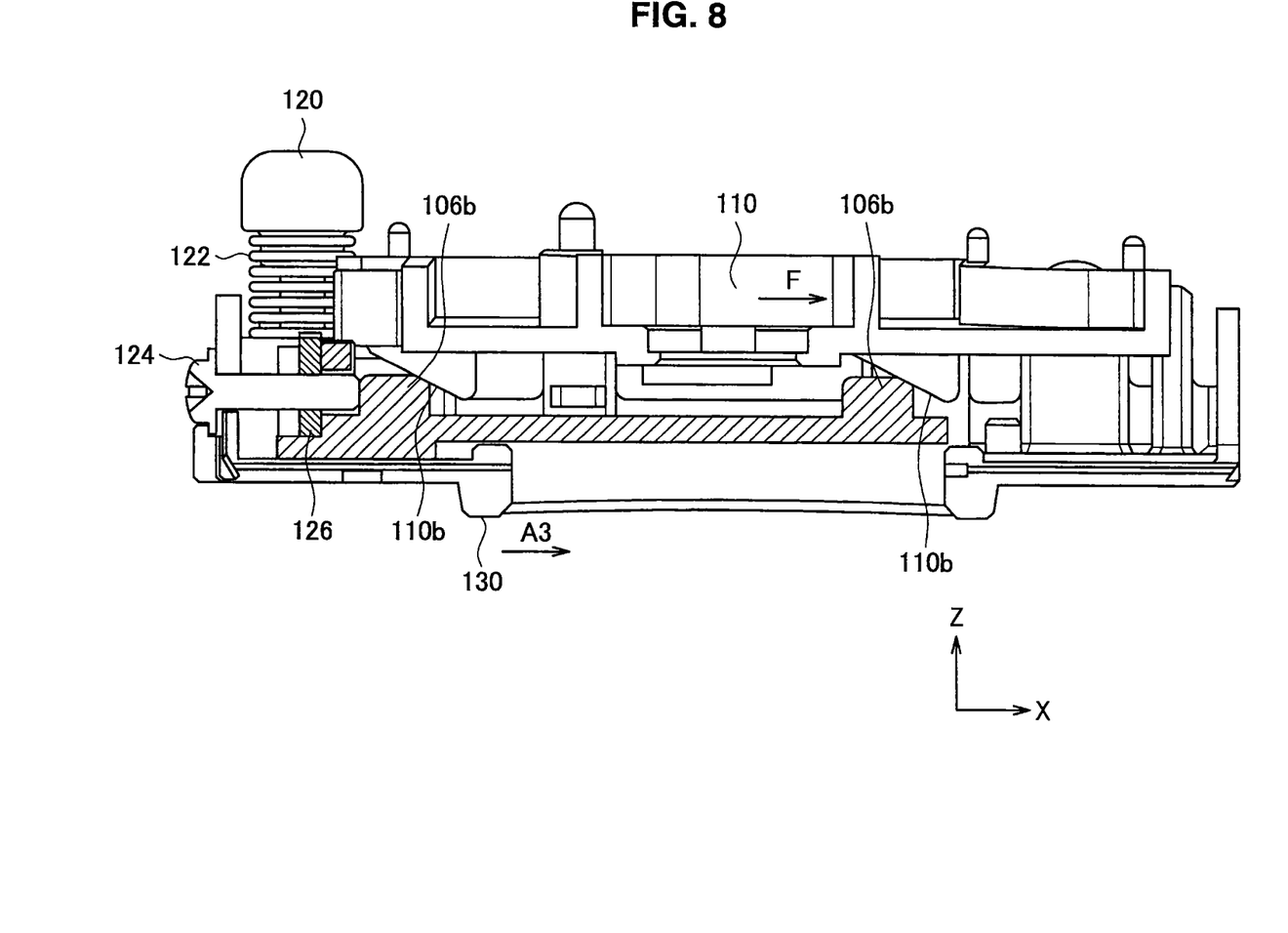
FIG. 8 is a cross-sectional view showing a movement of the CCD holder according to a sliding operation of the slider.
Figure 9:
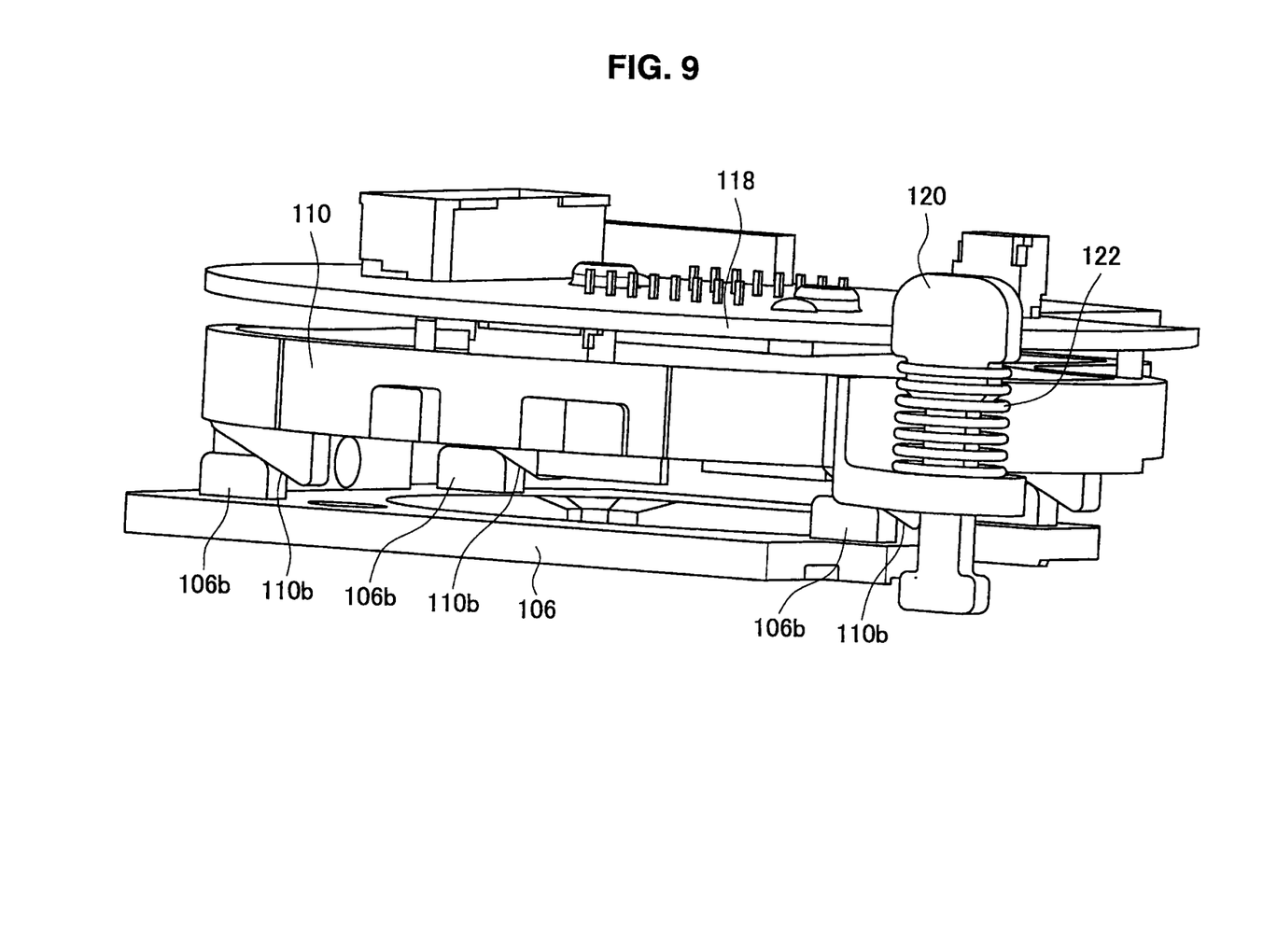
FIG. 9 is a schematic view showing the state in which protruding portions of the slider abut inclined faces of the CCD holder.

FIG. 8 is a cross-sectional view showing a movement of the CCD holder 110 according to a sliding operation of the slider 104. In addition, FIG. 9 is a schematic view showing the state in which the protruding portions 106b of the slider 106 abut the inclined faces 110b of the CCD holder 110.

As shown in FIG. 8, a flange back adjustment screw 124 is engaged with a female screw provided in a metal plate 126. The plate 126 is inserted into a groove 106c of the slider 104 shown in FIG. 6, so as to be integrated with the slider 106. In FIG. 8, when the flange back adjustment screw 124 is pivoted in a first direction, the plate 126 and the slider 106 move in the X direction according to the pivoting. When the slider 106 moves in the X direction, the inclined faces 110b are lifted according to the movement of the protruding portions 106b, and the CCD holder 110 thereby moves in the Z direction of FIG. 8 against the force of the compression coil springs 122.

In addition, when the flange back adjustment screw 124 is pivoted in a second direction that is the opposite direction to the first direction, the slider 106 moves in the direction opposite to the X direction (−X direction) according to the pivoting. Accordingly, the inclined faces 110b are lowered according to the movement of the protruding portions 106b, and the CCD holder 110 thereby moves in the direction opposite to the Z direction (−Z direction) by the biasing force of the compression coil springs 122.

In this manner, the CCD 114 mounted on the CCD holder 110 can be moved in the optical direction (Z direction) by pivoting the flange back adjustment screw 124, and flange back adjustment can thereby be performed. Note that, when the slider 106 moves in the X direction (or −X direction) to a predetermined extent or further within the pivoting range of the flange back adjustment screw 124, the slider 106 abuts the front chassis 104, and accordingly a stopper is configured to function. Accordingly, it is possible to prevent the engagement between the flange back adjustment screw 124 and the plate 126 from being released.

In addition, in FIG. 8, force in the direction opposite to the Z direction (−Z direction) acts on the CCD holder 110 by the biasing force of the compression coil springs 122. For this reason, as the inclined faces 110b abut the protruding portions 106b, a component force F in the X direction acts on the CCD holder 110.

[4. Holding Mechanism in Direction Orthogonal to Optical Axis]

Next, a holding mechanism in the direction orthogonal to the optical axis of the CCD holder 110 will be described. As shown in FIG. 4, in the front chassis 104, four protruding portions (regulating portions) 104c to 104f project toward the side of the CCD holder 110. In addition, as shown in FIG. 7, in the CCD holder 110, four protruding portions (abutting portions) 110c to 110f project in the direction orthogonal to the optical axis.

Figure 10:
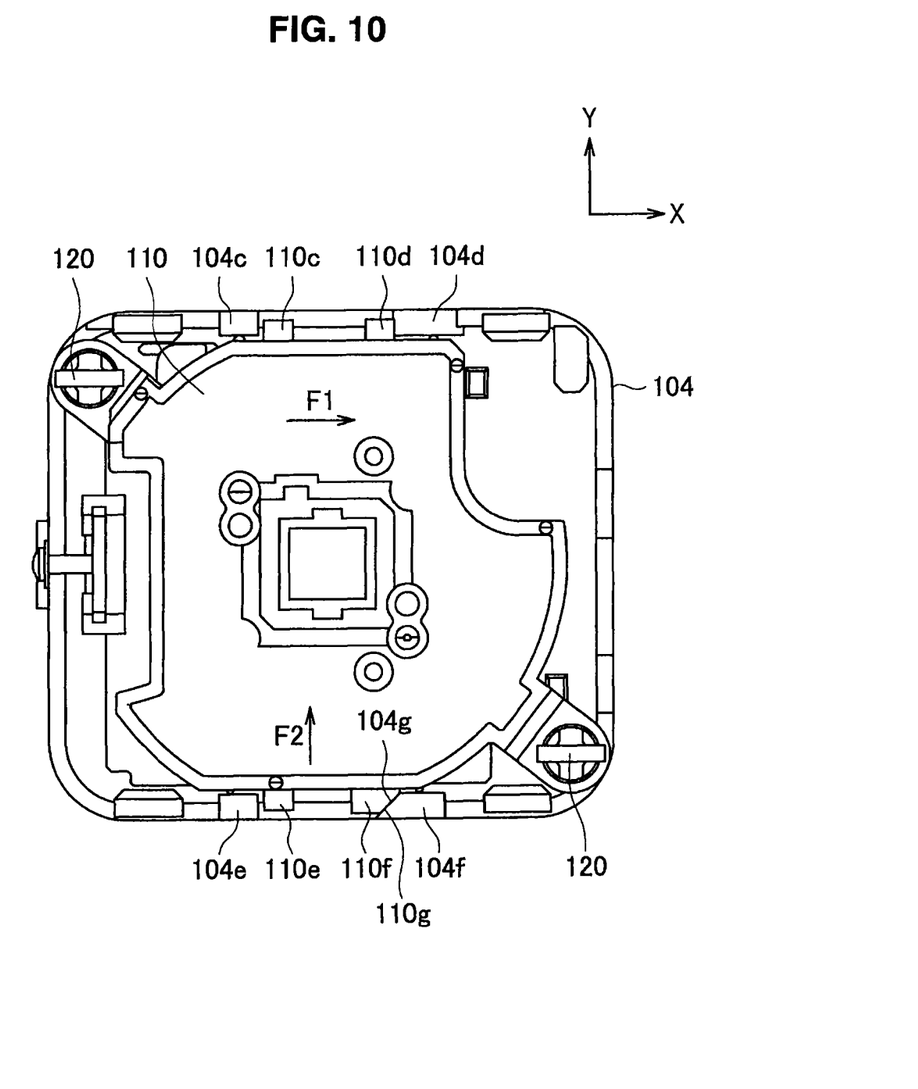
FIG. 10 is a schematic view showing the state of the imaging device as viewed from the side of the circuit board.
Figure 11:
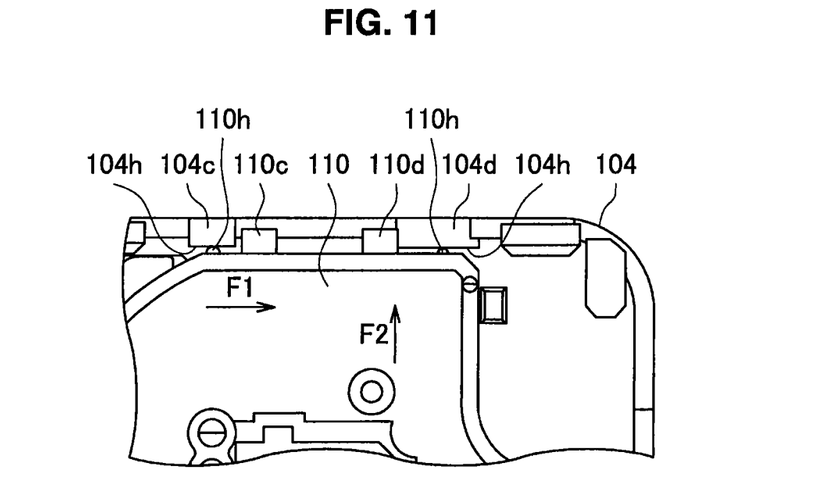
FIG. 11 is a schematic view showing the enlarged periphery of protruding portions 104*c* and 104*d* of FIG. 10.
Figure 12:
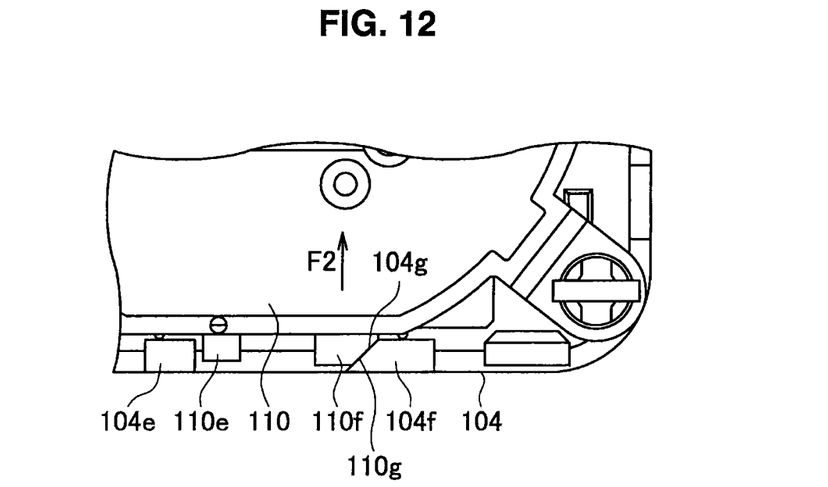
FIG. 12 is a schematic view showing the enlarged periphery of protruding portions 104*e* and 104*f* of FIG. 10.

FIG. 10 is a schematic view showing the state of the imaging device 100 as viewed from the side of the circuit board 118. In addition, FIG. 11 is a schematic view showing the enlarged periphery of the protruding portions 104c and 104d of FIG. 10, and FIG. 12 is a schematic view showing the enlarged periphery of the protruding portions 104e and 104f of FIG. 10. As shown in FIGS. 10 to 12, the two protruding portions 110c and 110d of the CCD holder 110 are inserted between the two protruding portions 104c and 104d of the front chassis 104. In addition, the two protruding portions 110e and 110f of the CCD holder 110 are inserted between the two protruding portions 104e and 104f of the front chassis 104.

As described above, the force F shown in FIGS. 8 and 10 acts on the CCD holder 110 by receiving the biasing force of the compression coil springs. For this reason, the protruding portion 110d of the CCD holder 110 abuts the protruding portion 104d of the front chassis 104 as shown in FIGS. 10 and 11. Accordingly, positioning of the CCD holder 110 in the X direction is attained (a reference face in the X direction).

In addition, as shown in FIG. 4, an inclined plane 104g is provided in the protruding portion 104f of the front chassis 104. In addition, as shown in FIG. 7, an inclined plane 110g is provided in the protruding portion 110f of the CCD holder 110. As shown in FIG. 10, the inclined plane 104g of the protruding portion 104f abuts the inclined plane 110g of the protruding portion 110f as the CCD holder 110 receives the force F, and a component force F2 in the Z direction acts on the CCD holder 110. Accordingly, as shown in FIG. 11, protruding portions 110h provided on a side face of the CCD holder 110 abut inner faces 104h (reference faces in the Y direction) of the protruding portions 104c and 104d of the front chassis 104, and positioning of the CCD holder 110 in the Y-axis direction is thereby attained.

Thus, according to the imaging device 100 of the present embodiment, positioning of the CCD holder 110 in the directions (X and Y directions) orthogonal to the optical axis thereof can be achieved with high accuracy by receiving the biasing force of the compression coil springs 122.

According to the present embodiment as described above, since the CCD holder 110 is set to be biased to the side of the lens mount 130, the member (slider 106) relating to the mechanism for performing flange back adjustment can be disposed on the side of the lens mount 130 rather than the CCD holder 110. Thus, the area of the CCD holder 110 can be sufficiently secured without causing the circuit board 118 mounted on the CCD holder 110 to receive a restriction created by the flange back adjustment mechanism. Accordingly, principal electronic components can be disposed on the circuit board 118 near the CCD 114, and the distance between the CCD and the principal electronic components can be reduced to the minimum, and therefore, the influence caused by noise and unnecessary radiation can be suppressed to the minimum level.

The preferred embodiment of the present invention has been described above with reference to the accompanying drawings, whilst the present invention is not limited to the above example, of course. A person skilled in the art may find various alternations and modifications within the scope of the appended claims, and it should be understood that they will naturally come under the technical scope of the present invention.

Additionally, the present technology may also be configured as below.

(1) An imaging device including:
a lens mount on which a lens is mounted;
an image sensor that has an imaging face on which a subject image is formed by the lens;

an image sensor holder on which the image sensor is mounted;

biasing members that bias the image sensor holder in a direction of the lens mount; and an adjustment mechanism that is provided between the image sensor holder and the lens mount to adjust a distance between the imaging face and the lens mount.

(2) The imaging device according to (1), wherein the adjustment mechanism includes a slider that is disposed between the lens mount and the image sensor holder and is configured to be slidable in a direction orthogonal to an optical axis of the lens, inclined faces that are provided on a side of the slider of the image sensor, and protruding portions that are provided on the slider and abut the inclined faces by biasing force of the biasing members, and wherein, with a movement of the slider in the direction orthogonal to the optical axis, the protruding portions relatively move with respect to the inclined faces, and the image sensor holder moves in a direction along the optical axis.

(3) The imaging device according to (1), wherein the biasing members are provided in two places that are diagonal on a face of the image sensor holder.

(4) The imaging device according to (2), wherein the protruding portions are provided in four places, and the inclined faces are provided in four places that correspond to the protruding portions.

(5) The imaging device according to (2), including:

a front chassis on which the lens mount is mounted, wherein the front chassis has a regulating portion that regulates a movement of the image sensor holder in the direction orthogonal to the optical axis, wherein the image sensor holder has an abutting portion that abuts the regulating portion of the front chassis by receiving force in a first direction orthogonal to the optical axis by the inclined faces, and wherein the regulating portion has an inclined plane that exerts force on the abutting portions in a second direction that is orthogonal to the first direction and orthogonal to the optical axis.

REFERENCE SIGNS LIST

100 Imaging device
106 Slider
106*b* protruding portion
110 CCD holder
110*b* Inclined face
114 Image sensor
122 Compression coil spring

The invention claimed is:

1. An imaging device comprising:

a lens mount on which a lens is mounted;

an image sensor that has an imaging face on which a subject image is formed by the lens;

an image sensor holder on which the image sensor is mounted;

biasing members that bias the image sensor holder in a direction of the lens mount; and an adjustment mechanism that is provided between the image sensor holder and the lens mount to adjust a distance between the imaging face and the lens mount wherein the adjustment mechanism includes a slider that is disposed between the lens mount and the image sensor holder and is configured to be slidable in a direction orthogonal to an optical axis of the lens, inclined faces that are provided on a side of the image sensor holder, and protruding portions that are provided on the slider and abut the inclined faces by biasing force of the biasing members, and wherein, with a movement of the slider in the direction orthogonal to the optical axis, the protruding portions relatively move with respect to the inclined faces, and the image sensor holder moves in a direction along the optical axis.

2. The imaging device according to claim 1, wherein the biasing members are provided in two places that are diagonal on a face of the image sensor holder.

3. The imaging device according to claim 1, wherein the protruding portions are provided in four places, and the inclined faces are provided in four places that correspond to the protruding portions.

4. The imaging device according to claim 1, further comprising:

a front chassis on which the lens mount is mounted, wherein the front chassis has a regulating portion that regulates a movement of the image sensor holder in the direction orthogonal to the optical axis, wherein the image sensor holder has an abutting portion that abuts the regulating portion of the front chassis by receiving force in a first direction orthogonal to the optical axis, and wherein the regulating portion has an inclined plane that exerts force on the abutting portions in a second direction that is orthogonal to the first direction and orthogonal to the optical axis.

\* \* \* \* \*